March 10, 1925.
H. J. HEIDER
CULTIVATOR
Filed Dec. 24, 1918
1,529,023
2 Sheets-Sheet 1
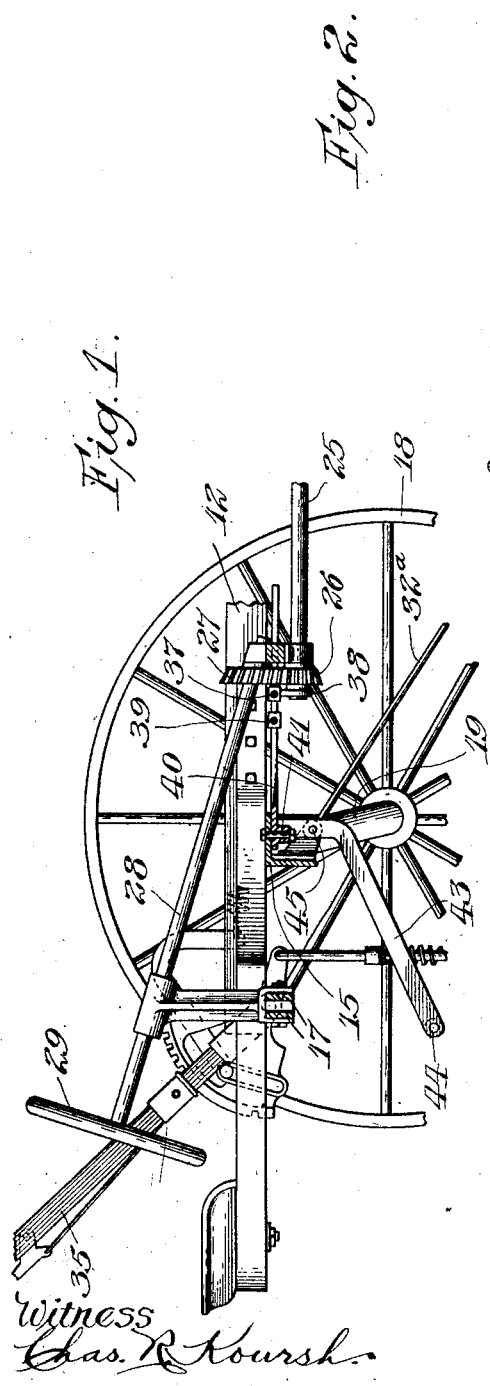
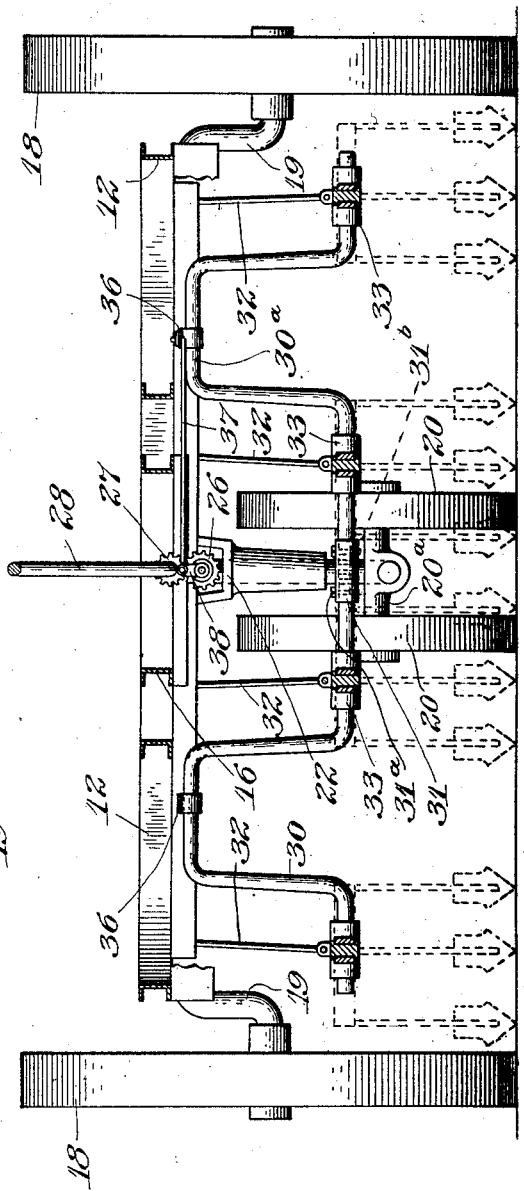
Inventor:
Henry J. Heider,
By Chas. C. Bulkley,
Atty.
Witness
Chas. R. Koursh.

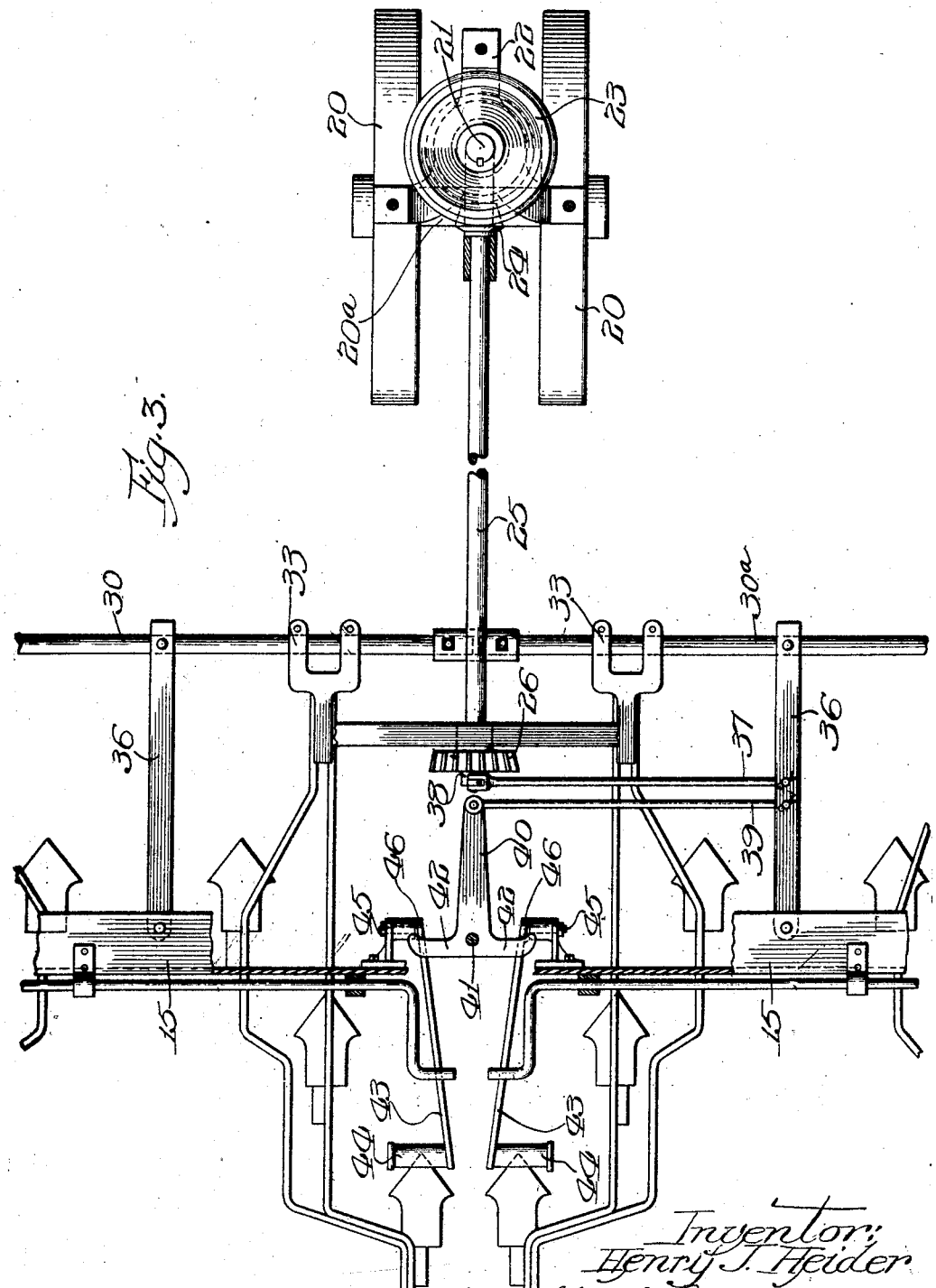

Patented Mar. 10, 1925.

1,529,023

UNITED STATES PATENT OFFICE.

HENRY J. HEIDER, OF CARROLL, IOWA, ASSIGNOR TO ROCK ISLAND PLOW COMPANY, OF ROCK ISLAND, ILLINOIS, A CORPORATION OF ILLINOIS.

CULTIVATOR.

Application filed December 24, 1918. Serial No. 268,120.

*To all whom it may concern:*

Be it known that I, HENRY J. HEIDER, a citizen of the United States of America, and resident of Carroll, Carroll County, Iowa, have invented a certain new and useful Improvement in Cultivators, of which the following is a specification.

My invention relates to improvements in cultivators.

One of the objects of my invention is the provision of a cultivator in which connections are provided between the steering mechanism and the gang shifting devices, so that the wheel of the forward truck of the cultivator may be angled so as to alter the direction of travel of the cultivator simultaneously with the lateral shifting of the cultivator gangs in the direction of the angling of the forward wheel, whereby the line of draft is always maintained substantially parallel to the row being cultivated and thus the power more effectively applied for propelling the implement and the shovels guided more effectively along the row.

These and other features and objects of my invention will be more readily understood by having reference to the accompanying drawings, in which I have illustrated one specific embodiment of my invention.

Figure 1 is a partial side elevation of a cultivator embodying the features of my invention.

Fig. 2 is a vertical transverse sectional view of the cultivator.

Fig. 3 is a plan view partially in section of a portion of the cultivator.

I have illustrated a cultivator of the two-row type, although my invention is applicable to a single-row cultivator. The frame consists essentially of an outside frame member 12 formed of a continuous piece of channel iron, and the rear frame bar 15 preferably consisting of an angle bar. Extending forwardly from the member 15 are a pair of intermediate longitudinal braces 16 which, at their forward end, are secured to the forward portion of the frame. Likewise, extending transversely across the machine at a point adjacent to the rear ends of the frame, are a pair of frame members 17, spaced a short distance apart. The supporting wheels 18 are mounted on lateral extensions of the stub axles 19, the inner ends of which axles extend upwardly and slightly rearwardly, being mounted at their upper ends in the frame in any suitable manner. The forward end of the frame is supported by the forward truck, provided with a pair of steering wheels 20, mounted on a transverse axle 20ᵃ to the mid-point of which the bent rod 21 is secured. This rod is provided with a vertically extending portion journalled in a sleeve carried by the bracket 22 secured to the frame. The upper end of this rod 21 is provided with a bevel gear 23, which meshes with a smaller bevel gear 24 on the forward end of the steering rod 25. This steering rod extends rearwardly, and mounted near its rear end is a gear 26 which meshes with a second gear 27 mounted upon the forward end of the second steering rod 28 which extends rearwardly at a slightly upward incline, as shown in Fig. 1, and being provided at its rear end with the steering wheel 29. With this construction, it will be readily seen that by operating the steering wheel, the rotation thereof is transmitted to the forward truck to angle the wheels 20.

The cultivator shovel gangs are carried by a pair of arch bars 30—30ᵃ, as clearly shown in Fig. 2, the shovel gangs being pivotally supported in the usual manner to the horizontal extensions of these two arch bars. The inner ends of these arch bars 30—30ᵃ are adjustably secured together by means of a sleeve 31 which is adapted to slip over the inner ends of each of the arch bars, and being secured thereto by means of the pins 31ᵃ, which are adapted to engage with one of the cylindrical holes 31ᵇ in the ends of the arch bars. There are a plurality of these holes 31ᵇ in the end of each arch bar, and by reason of this pin-and-hole connection between the arch bars and sleeve, the arch bars can be adjusted laterally to provide for varying widths between the two rows. By reason of this construction, the two arch bars in effect constitute a single adjustable double arch bar. This double arch bar is suitably supported by a plurality of suspension rods 32 which are secured to suitable yokes 33 mounted upon the arch bars 30—30ᵃ. These suspension rods 32 extend upwardly and forwardly and are connected at their upper ends to the frame. Likewise, secured to each of the yokes 33 are a plurality of suspension rods 32ª which extend upwardly and rearwardly, being connected at their upper ends to the transverse frame bar 15. Any suitable means may be employed for raising and lowering the shovel gangs such as the hand lever 35, which may be connected to the gangs in a manner illustrated in the copending application of L. H. Kaupke, Serial No. 183,154, filed July 27, 1917, patented August 9, 1921, 1,387,405 by which construction either one or both of the shovel gangs on either side of the machine may be raised. As this feature of construction forms no part of my present invention, I will not describe the same in detail, but reference may be had to said co-pending application for a complete understanding of the same. However, it is understood that any other means may be employed for raising and lowering the gangs, as far as my present invention is concerned.

In order to enable the shovel gangs to be readily shifted laterally, the arch bars 30—30ª are supported by two forwardly extending pivotal links 36, the rear ends of these links being pivotally supported by the transverse frame member 15, while the forward ends of the links are secured to the arches 31 of the double arch bar. Extending from an intermediate point of one of the links 36 is a rod 37, the opposite end of which rod is connected to an arm 38 on the rear end of the steering rod 25. Likewise connected to an intermediate point of the link 36 is a second rod 39, the inner end of which is connected to the forward end of a pivoted member 40. This member is pivoted about the pin 41 to the frame member 15, and is provided with a pair of lateral extensions 42 which are adapted to be engaged by the upwardly extending portions of two foot levers 43. These foot-levers, as clearly shown in Fig. 3, are provided with foot-rests 44, and are pivotally mounted at 45 in a suitable bracket carried by the frame member 15, and are provided with upwardly extending extensions 46 which engage with the lateral arms 42. With this construction, the arm 40 may be rocked in one direction or the other by operation of one or the other of foot-levers 43.

It will, therefore, be seen that the gangs can be shifted laterally and the wheels of the fore-truck angled simultaneously either through operation of the hand steering wheel or through the medium of the foot-levers. Thus when the hand steering wheel is operated, it rotates the steering shaft 25 and thus angles the wheels of the fore-truck and at the same time rotates the arm 38, thereby moving the rod 37 longitudinally to swing the link 36 about its pivotal point, which movement causes lateral shifting of the double arch bar 30 and the consequent lateral shifting of the shovel gangs. Similar simultaneous movement is likewise obtained through the operation of the foot-levers, as when one of the foot-levers 42 is operated, it rocks the member 40 about its pivotal point, thereby moving the rod 39 longitudinally, which in turn swings the link 36 about its pivotal point, and thus shifts the gangs laterally as before. This movement of the link 36 is also imparted to the rod 37, which rocks the arm 38 to thereby rotate the steering rod 25, thereby angling the wheels of the fore-truck.

It will thus be seen that I have devised a very efficient form of cultivator, and one in which the wheels of the fore-truck can be angled simultaneously with the lateral shifting of the gangs, so that it is possible to always maintain the line of draft substantially parallel to the rows being cultivated, whereby it is possible to more effectively follow the rows being cultivated. Furthermore, by having this steering movement controlled both by the hand-wheel and the foot-levers, it is possible to apply a very effective operating power so that the operator of the implement can more readily control this steering operation.

While I have illustrated and described one particular embodiment of my invention, it will be understood that I do not wish to be limited to the exact construction shown and described, but that various changes and modifications will readily suggest themselves to those skilled in the art without departing from the spirit and intent of my invention.

What I claim as my invention is:

1. In a cultivator, a supporting frame, a transversely-extending arch bar supported by suspension rods depending from said frame, shovel gangs suitably supported by said arch bar, a swinging link pivoted at one end to said frame and at the other end secured to the arch of said arch bar, steering mechanism for guiding said cultivator, and connections from said steering mechanism to a point on said swinging link whereby operation of said steering mechanism operates to shift the gangs laterally parallel to the line of draft.

2. In a cultivator, a supporting frame, a transversely-extending arch bar supported by suspension rods depending from said frame, shovel gangs suitably supported by said arch bar, a swinging link pivoted at one end to said frame and at the other end secured to the arch of said arch bar, foot-levers and connections therefrom to an intermediate point of said swinging link, whereby operation of said foot-levers operates to shift said gangs laterally with respect to the line of draft, steering mechanism for said cultivator, and connections from said steering mechanism to said swinging link, whereby operation of said steering mechanism shifts the gangs laterally parallel to the line of draft, and whereby operation of said foot-lever mechanism likewise operates said steering mechanism.

3. In a cultivator, a supporting frame, a transversely-extending arch bar supported in said frame, said bar being shaped so as to form two arches one located on each side of the cultivator, two sets of shovel gangs suitably supported by said arch bar, a pair of swinging links pivoted at one end to said frame and at the other end secured to the respective arches of said arch bar, steering mechanism for guiding said cultivator, and connections from said steering mechanism to a point on one of said swinging links whereby operation of said steering mechanism operates to shift the gangs laterally parallel to the line of draft.

4. In a cultivator, a supporting frame, a transversely-extending arch bar supported by suspension rods depending from said frame, said bar being shaped so as to form two arches, one located on each side of the cultivator, two sets of shovel gangs suitably supported by said arch bar, swinging links pivoted at one end to said frame and at the other end secured to the respective arches of said arch bar, foot-levers and connections therefrom to an intermediate point of one of said swinging links, whereby operation of said foot-levers operates to shift said gangs laterally with respect to the line of draft, steering mechanism for said cultivator, and connections from said steering mechanism to one of said swinging links, whereby operation of said steering mechanism shifts the gangs laterally parallel to the line of draft, and whereby operation of said foot-lever mechanism likewise operates said steering mechanism.

5. In a cultivator, a supporting-frame, a transversely-extending arch bar constructed to form two arches, suspension rods for floatingly supporting this arch bar, shovel gangs supported on this arch bar, a pair of parallel links connecting the respective upstanding arches of said arch bar with the frame, a pair of foot levers, manually operable steering mechanism, and means operably connecting said foot levers and steering mechanism with said parallel links whereby said arch bar may be shifted laterally parallel to the line of draft.

6. In a cultivator, a frame, a pair of foot-levers, an intermediate forwardly-projecting lever having lateral arms adapted to be engaged respectively by said foot-levers so as to swing said forwardly-projecting lever to one side or the other, two sets of shovel gangs and means whereby they are connected to said forwardly-projecting arm, manually-operable steering mechanism and means whereby the same is actuated from the foot-levers through the medium of said forwardly-projecting arm.

Signed by me at Rock Island, Rock Island County, Illinois, October, 1918.

HENRY J. HEIDER.